US009563496B2

(12) United States Patent
Otsuka et al.

(10) Patent No.: US 9,563,496 B2
(45) Date of Patent: Feb. 7, 2017

(54) EXTRACTION METHOD AND DEVICE

(71) Applicant: FUJITSU LIMITED, Kawasaki-shi, Kanagawa (JP)

(72) Inventors: Hiroshi Otsuka, Kawasaki (JP); Tetsuya Uchiumi, Kawasaki (JP); Yukihiro Watanabe, Kawasaki (JP); Yasuhide Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 132 days.

(21) Appl. No.: 14/694,020

(22) Filed: Apr. 23, 2015

(65) Prior Publication Data
US 2015/0378803 A1    Dec. 31, 2015

(30) Foreign Application Priority Data

Jun. 27, 2014   (JP) ................................ 2014-132736

(51) Int. Cl.
| | | |
|---|---|---|
| *G06F 11/00* | (2006.01) | |
| *G06F 11/07* | (2006.01) | |
| *G06F 11/34* | (2006.01) | |

(52) U.S. Cl.
CPC ......... *G06F 11/079* (2013.01); *G06F 11/0709* (2013.01); *G06F 11/0751* (2013.01); *G06F 11/0778* (2013.01); *G06F 11/3476* (2013.01); *G06F 11/3409* (2013.01); *G06F 2201/86* (2013.01)

(58) Field of Classification Search
CPC .............. G06F 11/0709; G06F 11/0751; G06F 11/0778; G06F 11/079; G06F 11/3409; G06F 11/3476; G06F 2201/86
See application file for complete search history.

(56) References Cited

U.S. PATENT DOCUMENTS

| | | | | |
|---|---|---|---|---|
| 9,329,922 B1 * | 5/2016 | McFarlane | ............ | G06F 11/079 |
| 2005/0172162 A1 | 8/2005 | Takahashi et al. | | |

(Continued)

FOREIGN PATENT DOCUMENTS

| | | |
|---|---|---|
| JP | 2005-327261 | 11/2005 |
| JP | 2007-293393 | 11/2007 |

(Continued)

*Primary Examiner* — Joshua P Lottich
(74) *Attorney, Agent, or Firm* — Fujitsu Patent Center

(57) ABSTRACT

An extraction method comprising: acquiring configuration information indicating a configuration of a processing device for each generation that represents a respective time period between configuration modifications, and extracting first information indicating configuration modifications between generations based on a plurality of generations of the acquired configuration information; acquiring performance information indicating various types of performance of the processing device at respective times, and extracting, as second information associated with one of the generations, a time when an abnormality was detected in change to a time series of the acquired performance information; acquiring event information indicating an event occurring in the processing device at respective times, and extracting, as third information associated with one of the generations, a time of event information creation when an abnormality was detected; and extracting the first information, the second information, and the third information that have a relationship to each other.

15 Claims, 22 Drawing Sheets

(56) References Cited

U.S. PATENT DOCUMENTS

| | | | |
|---|---|---|---|
| 2011/0202802 A1 | 8/2011 | Gotoh et al. | |
| 2011/0314138 A1* | 12/2011 | Kobayashi | G06F 11/3476 709/222 |
| 2012/0096065 A1* | 4/2012 | Suit | H04L 12/6418 709/202 |
| 2012/0096134 A1* | 4/2012 | Suit | G06F 9/5072 709/221 |
| 2015/0142385 A1* | 5/2015 | Otsuka | G06F 11/0706 702/182 |
| 2016/0124792 A1* | 5/2016 | Togawa | G06F 11/079 714/37 |

FOREIGN PATENT DOCUMENTS

| | | |
|---|---|---|
| WO | 2004/061681 | 7/2004 |
| WO | 2010/050381 | 5/2010 |

* cited by examiner

FIG.3 web01

[event log]

Aug 1 02:07:01 localhost kernel: imklog 4.6.2, log source = /proc/kmsg started.
Aug 1 02:07:01 localhost rsyslogd: [origin software="rsyslogd" swVersion="4.6.2" x-pid="1298" x-info="http://www.rsyslog.com"] (re)start
Aug 1 13:06:47 localhost kernel: e1000: eth1 NIC Link is Down
..

FIG.4

| 2013/8/1 | 07:24:55 | AM | CPU | %usr | %nice | %sys | %iowait | %irq | %soft | %steal | %guest | %idle |
|---|---|---|---|---|---|---|---|---|---|---|---|---|
| 2013/8/1 | 07:24:55 | AM | 1 | 1.04 | 0.00 | 0.87 | 0.31 | 0.01 | 0.05 | 0.00 | 0.00 | 97.72 | web01

FIG.5 web01 GENERATION:1

[/command/rpm_qa]

mysql-5.1.61-1.el6_2.1.i686
mysql-libs-5.1.61-1.el6_2.1.i686
mysql-server-5.1.61-1.el6_2.1.i686
..

FIG.6

| GENERATION | DATE-TIME | POSITION | KEY | CONTENTS |
|---|---|---|---|---|
| 1 | 2013/8/1 00:00:00 | web01 | cpu1_usage | 0.80 |
| 1 | – | web01 | /command/rpm -qi | mysql-libs-5.1.61-1.el6_2.1.i686 |
| 1 | – | web01 | /command/rpm -qi | mysql-5.1.61-1.el6_2.1.i686 |
| 1 | 2013/8/1 00:00:10 | web01 | – | localhost kernel: Kernel logging (proc) stopped. |
| 1 | 2013/8/1 00:02:00 | web01 | – | localhost kernel: imklog 4.6.2, log source = /proc/kmsg started. |
| 2 | 2013/8/2 00:00:00 | web01 | cpu1_usage | 0.10 |
| 2 | – | web01 | /command/rpm -qi | mysql-libs-5.1.61-1.el6_2.1.i686 |
| 2 | – | web01 | /command/rpm -qi | mysql-server-5.1.61-1.el6_2.1.i686 |
| 2 | – | web01 | /command/rpm -qi | mysql-5.1.61-1.el6_2.1.i686 |
| 2 | 2013/9/1 01:00:30 | web01 | – | localhost kernel: Kernel logging (proc) stopped. |

61

A, B, C

| TIME SERIES ABNORMALITY | | |
|---|---|---|
| GENERATION | TIME SERIES ABNORMALITY ID | DATE-TIME |
| 1 | t001 | 2013/8/1 00:15:00 |
| | | |

| GENERATION | DATE-TIME | POSITION | KEY | CONTENT |
|---|---|---|---|---|
| 1 | 2013/8/1 00:00:00 | web01 | cpu1_usage | 0.80 |
| 1 | — | web01 | /command/rpm -qi | mysql-libs-5.1.61-1.el6_2.1.i686 |
| 1 | — | web01 | /command/rpm -qi | mysql-5.1.61-1.el6_2.1.i686 |
| 1 | 2013/8/1 00:00:10 | web01 | syslog002 | localhost kernel: Kernel logging (proc) stopped. |
| 1 | 2013/8/1 00:30:00 | web01 | syslog001 | localhost kernel: imklog 4.6.2, log source = /proc/kmsg started. |
| 2 | 2013/8/2 00:00:00 | web01 | cpu1_usage | 0.10 |
| 2 | — | web01 | /command/rpm -qi | mysql-libs-5.1.61-1.el6_2.1.i686 |
| 2 | — | web01 | /command/rpm -qi | mysql-server-5.1.61-1.el6_2.1.i686 |
| 2 | — | web01 | /command/rpm -qi | mysql-5.1.61-1.el6_2.1.i686 |
| 2 | 2013/9/1 01:00:30 | web01 | syslog002 | localhost kernel: Kernel logging (proc) stopped. |

FIG.10

| | PATTERN ABNORMALITY | |
|---|---|---|
| GENERATION | PATTERN ABNORMALITY ID | DATE-TIME |
| 1 | p001 | 2013/8/1 00:30:00 |
| | | |

| KEY ID | KEY | GENERATION | | | | | |
|---|---|---|---|---|---|---|---|
| | | 1 | 2 | 3 | 4 | 5 | 6 |
| 1 | /command/chkconfig | 1 | 1 | 1 | 1 | 1 | 1 |
| 2 | /command/df_a | 1 | 2 | 3 | 4 | 5 | 6 |
| 3 | /command/df_h | 1 | 1 | 1 | 1 | 1 | 1 |
| 4 | /command/df_i | 1 | 2 | 3 | 4 | 5 | 6 |
| 5 | /command/df_k | 1 | 2 | 3 | 4 | 5 | 6 |
| 6 | /command/free | 1 | 2 | 3 | 4 | 5 | 6 |
| 7 | /command/kernel | 1 | 1 | 1 | 1 | 1 | 1 |
| 8 | /command/lastlog | 1 | 1 | 1 | 1 | 1 | 1 |
| 9 | /command/rpm_qa | 1 | 2 | 2 | 4 | 4 | 4 |
| 10 | /command/rpm_qaf | 1 | 2 | 2 | 4 | 4 | 4 |
| 11 | /command/rpm_qai | 1 | 2 | 2 | 2 | 2 | 2 |
| 12 | /etc/fstab | 1 | 1 | 1 | 1 | 1 | 1 |
| 13 | /etc/group | 1 | 1 | 1 | 1 | 1 | 6 |
| 14 | /etc/passwd | 1 | 1 | 1 | 1 | 1 | 6 |

| CONFIGURATION MODIFICATION PATTERN ID | GENERATION | KEY ID |
|---|---|---|
| c001 | 2 | 9,10,11 |
| c002 | 4 | 9,10 |
| c003 | 6 | 13,14 |

FIG.13

| CONFIGURATION MODIFICATION PATTERN | | |
|---|---|---|
| GENERATION | CONFIGURATION MODIFICATION PATTERN ID | DATE-TIME |
| 1 | c001 | 2013/8/1 00:00:00 |
| 2 | c002 | 2013/8/2 00:00:00 |
| | | |

FIG.14

| RESULT ID | ID LIST |
|---|---|
| 001 | c001, t001, p001 |
| | |

FIG.23

| id | KEY | GENERATION ||||||
| --- | --- | --- | --- | --- | --- | --- | --- |
| | | 1 | 2 | 3 | 4 | 5 | 6 |
| 1 | /command/chkconfig | 1 | 1 | 1 | 1 | 1 | 1 |
| 2 | /command/df_a | 1 | 2 | 3 | 4 | 5 | 6 |
| 3 | /command/df_h | 1 | 1 | 1 | 1 | 1 | 1 |
| 4 | /command/df_i | 1 | 2 | 3 | 4 | 5 | 6 |
| 5 | /command/df_k | 1 | 2 | 3 | 4 | 5 | 6 |
| 6 | /command/free | 1 | 2 | 3 | 4 | 5 | 6 |
| 7 | /command/kernel | 0 | 0 | 0 | 0 | 0 | 0 |
| 8 | /command/lastlog | 1 | 1 | 1 | 1 | 1 | 1 |
| 9 | /command/rpm_qa | 1 | 2 | 2 | 4 | 4 | 4 |
| 10 | /command/rpm_qaf | 1 | 2 | 2 | 4 | 4 | 4 |
| 11 | /command/rpm_qai | 1 | 2 | 2 | 2 | 2 | 2 |
| 12 | /etc/fstab | 0 | 0 | 0 | 0 | 0 | 0 |
| 13 | /etc/group | 1 | 1 | 1 | 1 | 1 | 6 |
| 14 | /etc/passwd | 1 | 1 | 1 | 1 | 1 | 6 |

| RULE ID | KEY | THRESHOLD |
|---|---|---|
| 1 | cpu1_usage | 0.75 |

| GENERATION | DATE-TIME | POSITION | KEY | CONTENT |
|---|---|---|---|---|
| 1 | 2013/8/1 00:00:00 | web01 | cpu1_usage | 0.80 |
| 1 | 2013/8/1 01:00:00 | web01 | cpu1_usage | 0.70 |
| 1 | 2013/8/1 02:00:00 | web01 | cpu1_usage | 0.80 |
| 1 | 2013/8/1 03:00:00 | web01 | cpu1_usage | 0.90 |

FIG.27

| GENERATION | DATE-TIME | POSITION | KEY | CONTENT |
|---|---|---|---|---|
| 1 | 2013/8/1 00:00:00 | web01 | cpu1_usage_event | — |

EXTRACTION METHOD AND DEVICE

CROSS-REFERENCE TO RELATED APPLICATION

This application is based upon and claims the benefit of priority of the prior Japanese Patent Application, No. 2014-132736, filed on Jun. 27, 2014, the entire contents of which are incorporated herein by reference.

FIELD

The embodiments discussed herein are related to an extraction method, an extraction device, and a recording medium storing an extraction program.

BACKGROUND

Hitherto, a service was performed that monitors a system operating at a user side, and when an abnormality occurring in the system has been detected, notifies a systems administrator, or the like, at the user side that the abnormality has occurred. A method of analyzing generation states in an event log generated by the system and contents of the event log exists as a method to detect an abnormally occurring in the system. Then, when an abnormality has been detected in the system, the cause of the abnormality is deduced based on information such as the system configuration or performance.

Related Patent Documents

Japanese Laid-open Patent Publication No. 2007-293393
International Publication Pamphlet No. WO2004/061681

SUMMARY

According to an aspect of the embodiments, an extraction method comprises: acquiring configuration information indicating a configuration of a processing device for each generation that represents a respective time period between configuration modifications, and extracting first information indicating configuration modifications between generations based on a plurality of generations of the acquired configuration information; acquiring performance information indicating various types of performance of the processing device at respective times, and extracting, as second information associated with one of the generations, a time when an abnormality was detected in change to a time series of the acquired performance information; acquiring event information indicating an event occurring in the processing device at respective times, and extracting, as third information associated with one of the generations, a time of event information creation when an abnormality was detected; and by a processor, extracting any pieces of the first information, pieces of the second information, and pieces of the third information that have a relationship to each other, based on the generation indicated by the first information and a time when the processing device was modified to the configuration of an indicated generation, based on a time indicated by the second information and the generation associated with the second information, and based on a time indicated by the third information and the generation associated with the third information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of an event log;

FIG. 4 is a diagram illustrating an example of a performance log;

FIG. 5 is a diagram illustrating an example of a configuration log;

FIG. 6 is a diagram illustrating an example of a common format data table;

FIG. 9 is a diagram illustrating an example of a common format data table;

FIG. 10 is a diagram illustrating an example of a pattern abnormality table;

FIG. 11 is a diagram illustrating an example of a generation table;

FIG. 12 is a diagram illustrating an example of a key list;

FIG. 13 is a diagram illustrating an example of a configuration modification pattern table;

FIG. 14 is a diagram illustrating an example of an extraction result list;

FIG. 23 is a diagram for explaining another extraction example of a configuration modification pattern;

FIG. 25 is a diagram illustrating an example of an event building rule table;

FIG. 26 is a diagram of an example of common format data that is subject to processing by an event creation section;

FIG. 27 is a diagram illustrating an example of a created event;

DESCRIPTION OF EMBODIMENTS

Detailed explanation follows regarding an example of an exemplary embodiment according to technology disclosed herein, with reference to the drawings.

First Exemplary Embodiment

Figure 1:
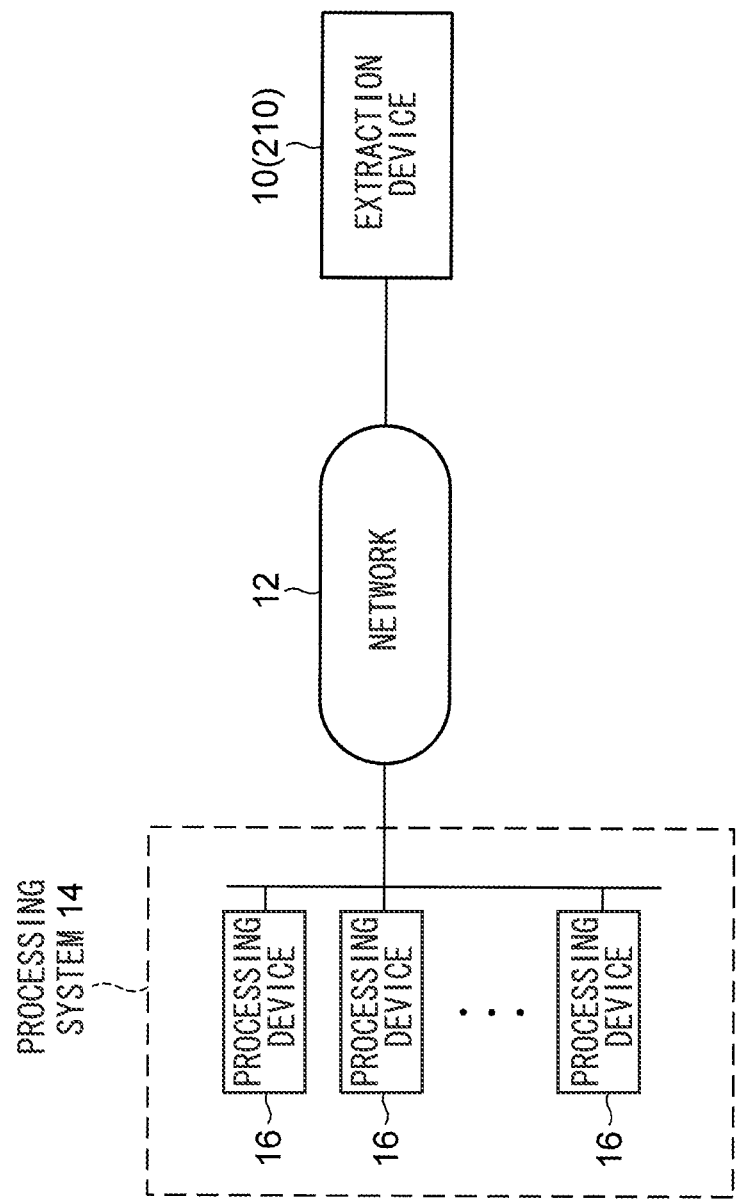
FIG. 1 is a schematic diagram illustrating a system configuration including an extraction device according to a first and a second exemplary embodiment.

As illustrated in FIG. 1, an extraction device 10 according to a first exemplary embodiment is connected, through a network 12 such as the internet, to a processing system 14 that includes plural processing devices 16.

Figure 2:
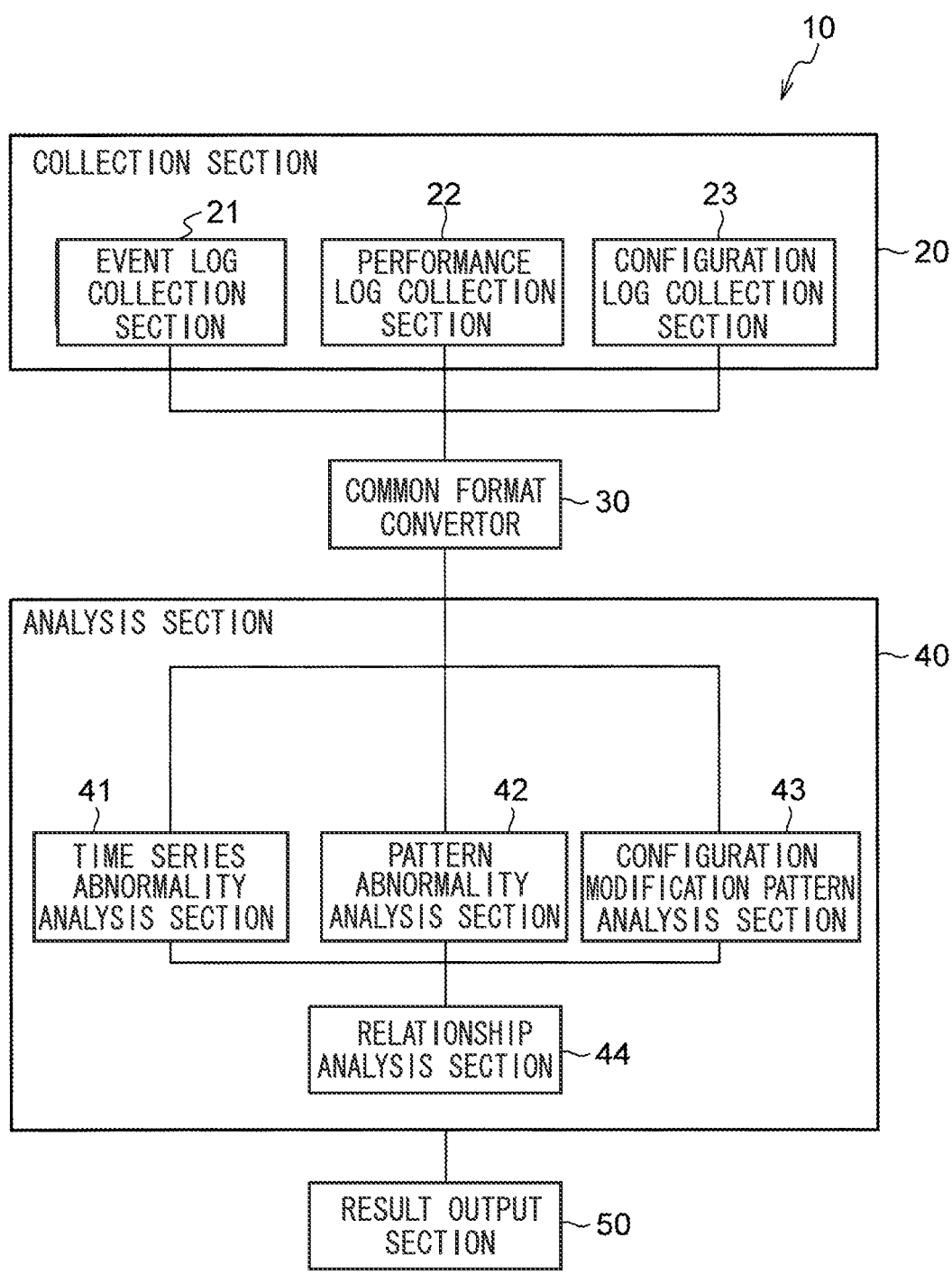
FIG. 2 is a functional block diagram of an extraction device according to the first exemplary embodiment.

FIG. 2 illustrates a functional block diagram of the extraction device 10. As illustrated in FIG. 2, the extraction device 10 includes a collection section 20, a common format convertor 30, an analysis section 40, and a result output section 50. Moreover, the collection section 20 includes an event log collection section 21, a performance log collection section 22, and a configuration log collection section 23. Moreover, the analysis section 40 includes a time series abnormality analysis section 41, a pattern abnormality analysis section 42, a configuration modification pattern analysis section 43, and a relationship analysis section 44.

The event log collection section 21 collects an event log recording phenomena (events) occurring in the processing devices 16. FIG. 3 illustrates an example of an event log. The event log illustrated in FIG. 3 is an example of an event log recording start-up events of the processing devices 16. The event log collection section 21 collects such an event log together with identification information for the processing devices 16 (processing device IDs, "web01" in the example of FIG. 3).

The performance log collection section 22 collects a performance log indicating resource usage ratios and the like of CPUs, memory, and the like of the processing devices 16. FIG. 4 illustrates an example of a performance log. The performance log illustrated in FIG. 4 is an example of a performance log itemizing the usage ratio and the like of a CPU identified by identification information "1" in the processing devices 16. The performance log collection section 22 collects such a performance log together with identification information for the processing devices 16 (processing device IDs; "web01" in the example of FIG. 4).

The configuration log collection section 23 collects configuration logs indicating configurations of hardware configuring the processing devices 16, and configurations of software such as operating systems (OS) and applications installed on the processing devices 16. FIG. 5 illustrates an example of a configuration log. The configuration log illustrated in FIG. 5 is an example of a configuration log recording a list of programs installed on the processing devices 16. The configuration log collection section 23 collects such a configuration log together with identification information for the processing devices 16 (processing device IDs; "web01" in the example of FIG. 5) and information of configuration generation of indicated by the configuration log ("generation: 1" in the example of FIG. 5).

The configuration of the processing devices 16 is modified at a regular timing (for example, every month), or at a timing when the need for modification arises. In the present exemplary embodiment, a time period, from a point in time when the configuration of the processing devices 16 was modified until a point in time when the configuration of the processing devices 16 is next modified, is handled as a single configuration generation. In the present exemplary embodiment, for example, date-time information indicating when configuration modification was performed is acquired from the operating side (the side of the user using the processing device 16) and date-time information indicating when each generation began is held in the extraction device 10.

The common format convertor 30 receives each log collected by the event log collection section 21, the performance log collection section 22, and the configuration log collection section 23, and converts each received log to a common format. For example, a format including values corresponding to respective items of "generation", "date-time", "position", "key", and "contents" may be employed as the common format. "Position" is information indicating where the processing device 16, from which the log was collected, was deployed, and is, for example, associated with a value of a processing device ID. The "key" is information that can be used to classify values corresponding to the "contents" item.

More specifically, the common format convertor 30, for example, divides the received logs into specific units such as row units, and by extracting from the received logs a portion that matches a predetermined rule, extracts respective pieces of data in the specific units associated with the common format. As illustrated in FIG. 6, the common format convertor 30, for example, converts the data extracted from the logs into the common format by recording the values included in the data extracted from the logs in a common format data table 61 in which each column is associated with a respective item of the common format. Namely, each row of the common format data table 61 is data converted into the common format (referred to as "common format data" hereafter). Any items in the common format data having no corresponding value in the data extracted from the logs are left blank. Since the value held by each piece of data depends on the type of log the data was extracted from, the common format convertor 30 predefines which item of the common format corresponds to each value held by the data extracted from the logs, according to the type of log extracted from.

More specifically, the common format convertor 30, for example, extracts each piece of data from an event log like that illustrated in FIG. 3, using date-time information (the portions in the dashed lines in FIG. 3) as a delimiter, and records the date-time information of the extracted data as the "date-time" item of the common format data table 61. The common format convertor 30 records the message portion of the data extracted from the log, excluding the date-time information, as the "contents" item. The common format convertor 30 records the processing device ID that was collected together with the log as the "position" item of the common format data table 61. Moreover, for each of the logs that data was extracted from, the common format convertor 30 determines which configuration generation the processing device 16 at occurrence or when collected in a log, based on date-time information held by the extraction device 10 indicating when each generation began, and date-time information included in the data extracted from the logs. The determined generation information is then recorded in the "generation" item of the common format data table 61. The row indicated by A in FIG. 6 is an example of the common format data that has been converted from the data extracted from the event logs.

The common format convertor 30, for example, extracts as a single data item each performance item, together with date-time information and CPU identification information from a performance log like that illustrated in FIG. 4. The date-time information of the extracted data is then recorded in the "date-time" item of the common format data table 61, a combination of the CPU identification information and the name of the performance item are recorded in the "key" item, and the value of the performance item is recorded in the "contents" item. The common format convertor 30 also records the "generation" and "position" items similarly to as described above. The row indicated by B in FIG. 6 is an example of the common format data converted from the data extracted from the performance log.

From a configuration log like that illustrated in FIG. 5, for example, the common format convertor 30 extracts as a piece of single data respective elements (for example, one program from each row, from the second row onwards in the example of FIG. 5) together with a header row (for example, the first row). The value of the header row of the extracted data is recorded in the "key" item of the common format data table 61, and the value of each element is recorded in the "content" item. The common format convertor 30 records the generation information and the processing device ID, collected together with the configuration log of the extract source, in the "generation" and "position" items of the common format data table 61. The row indicated by C in FIG. 6 is an example of common format data converted from the data extracted from the configuration logs.

The time series abnormality analysis section 41 extracts common format data with a "date-time" item that is non-blank and a "contents" item with a numeric value, from out of the common format data recorded in the common format data table 61. The time series abnormality analysis section 41 analyzes the presence or absence of abnormalities in time series changes to numeric values included in the extracted common format data (referred to as "time series abnormalities" hereafter). The common format data including numeric values are mostly common format data converted from data extracted from the performance logs collected by the performance log collection section 22; however, there is no limitation thereto. Determination can be made as to whether or not abnormalities occur in a CPU by, for example, analyzing time series abnormalities based on the common format data that has been converted from data indicating CPU performance extracted from the performance logs, like that illustrated in FIG. 4.

Figures 7, 8:
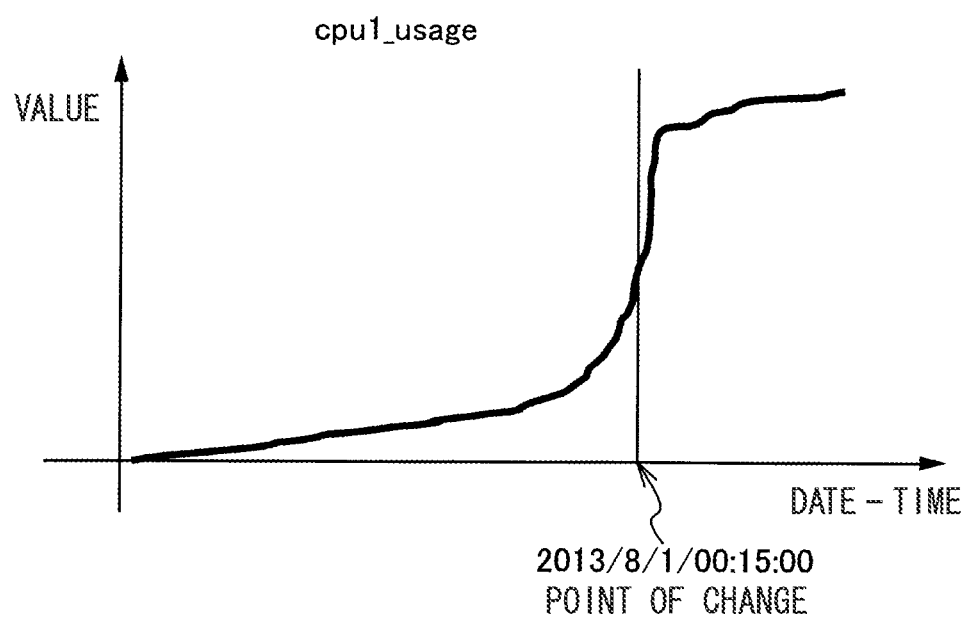
FIG. 7 is a diagram for explaining time series abnormality analysis.
FIG. 8 is a diagram illustrating an example of a time series abnormality table.

Specifically, the time series abnormality analysis section 41 extracts, as places where time series abnormalities occur, points of change, detected using for example anomaly analysis, in numeric values having the same "key" and "position" in the common format data arranged in a series sorted by the date-time information. Points where there is a sudden change in numeric value, such as illustrated for example in FIG. 7, points where the pattern of change in the numeric values do not match a predetermined normal change pattern, or the like may be designated as points of change. The time series abnormality analysis section 41 allocates identification information (time series abnormality IDs) to date-time information corresponding to places from which time series abnormalities were extracted, and this information is recorded in a time series abnormality table 62, like that illustrated in FIG. 8 for example, as information indicating a time series abnormality. The time series abnormality analysis section 41 determines the generation that includes the date-time information of the time series abnormalities based on held date-time information indicating the beginning of generations, and records the determined generation information associated with the information of the time series abnormalities.

The pattern abnormality analysis section 42 extracts from out of the common format data recorded in the common format data table 61 any common format data for which the "date-time" item is non-blank and the "contents" item is not a numeric value. The pattern abnormality analysis section 42 analyzes the presence of absence of abnormalities in emerging patterns (referred to as "pattern abnormalities" hereafter) based on what kind of pattern emerges in the extracted common format data. In the first exemplary embodiment, the common format data converted from the data extracted from the event logs is extracted from the common format data table 61 as common format data subject to pattern abnormality analysis.

The common format data converted from the data extracted from the event logs has a blank "key" item, as is illustrated by row A in FIG. 6. Firstly, for each of the pieces of extracted common format data, the pattern abnormality analysis section 42 creates a key by which the common format data is classifiable based on values recorded in the "contents" item. For example, a dictionary may be pre-prepared, defining plural combinations of plural words with a key. Then, when words included in the "contents" item of the extracted common format data incorporate a specific proportion or more of plural words of any combination defined in the dictionary, the key of that combination is created as the key to that common format data. The pattern abnormality analysis section 42, for example, records the created key in the "key" item that was blank in the common format data table 61, as indicated, for example, by the portions in the dashed lines in FIG. 9.

The pattern abnormality analysis section 42 analyzes a pattern expressed by the keys created for a given common format data item in a series sorted by the date-time information. For example, when the same repeatedly emerging pattern is extracted, and then a pattern emerges that does not match this pattern, the non-matching pattern may be extracted as a pattern abnormality. The pattern abnormality analysis section 42 allocates identification information (a pattern abnormality ID) to the date-time information of any common format data that includes a key corresponding to places from which a pattern abnormality was extracted, and is recorded in a pattern abnormality table 63 like that illustrated for example in FIG. 10 as information representing a pattern abnormality. The pattern abnormality analysis section 42 determines the generation that includes the date-time information of the pattern abnormality based on the held date-time information indicating the beginning of generations, and records the determined generation information associated with the pattern abnormality information.

The configuration modification pattern analysis section 43 analyzes configuration modification patterns, from out of the common format data recorded in the common format data table 61, using common format data converted from data extracted from the configuration log. A configuration modification pattern is information indicating generations where each of the configuration elements (for example, each program) was modified. In cases in which there was a mistake in, for example, the settings, when a configuration of the processing devices 16 was modified, the cause of the abnormality occurring in the processing devices 16 is easily deduced by extracting the configuration modification pattern since there is a single cause of the abnormality occurring in the processing devices 16.

Out of the common format data recorded in the common format data table 61, the configuration modification pattern analysis section 43 extracts any data not subject to analysis by the time series abnormality analysis section 41 or the pattern abnormality analysis section 42. In the present exemplary embodiment, common format data, converted from the data extracted from the configuration log, is extracted. The configuration modification pattern analysis section 43 compares each item of extracted common format data against other common format data items having the same "key" and "position" and an older date-time, and creates a generation table 64 that indicates whether or not there has been a change in values for each generation. For example, as illustrated in FIG. 11, keys of the extracted common format data may be associated with respective rows, and a table in which each generation is associated with a respective column employed as the generation table 64. Moreover, identification information (a key ID) is allocated to each key. In each cell of the generation table 64 in the example of FIG. 11, generations having the same value for "content" in common format data having the key associated with the row of that cell are set to the same value as each other, and generations having different values for the "content" in the common format data are set to different values from each other.

Based on the created generation table 64, the configuration modification pattern analysis section 43 extracts information of common format data in which a value changed between configuration generations of the processing devices 16. More specifically, the configuration modification pattern analysis section 43 extracts the key IDs in the generation table 64 allocated to the keys corresponding to rows in which the value set for the column of generation g is different from the value set for the column of generation g−1 (A in FIG. 11), and, for example, records the extracted key IDs in a key list 65 like that illustrated in FIG. 12. The configuration modification pattern analysis section 43 allocates identification information (a configuration modification pattern ID) to a pattern that enumerates the key IDs extracted for each generation as the configuration modification pattern.

Rows in the generation table 64 (B in FIG. 11) in which all the values are different in every generation subjected to analysis are determined so show that it is normal to change settings every time the configuration is modified, and these rows are excluded when extracting the configuration modification patterns. The configuration modification pattern analysis section 43 determines what date-time information corresponds to the configuration modification pattern, based on the generation including the extracted configuration modification pattern, and held date-time information of the beginnings of generations. The configuration modification pattern analysis section 43, for example, allocates a configuration modification pattern ID to the determined date-time information in a configuration modification pattern table 66 like that illustrated in FIG. 13, and records this as information representing a configuration modification pattern. The configuration modification pattern analysis section 43 also records generation information including configuration modification patterns indicated by the configuration modification pattern IDs, in association with information representing the configuration modification patterns.

The relationship analysis section 44 analyzes relationships between the time series abnormalities extracted by the time series abnormality analysis section 41, the pattern abnormalities extracted by the pattern abnormality analysis section 42, and the configuration modification patterns extracted by the configuration modification pattern analysis section 43, and outputs groups of related information as a set of extraction results. More specifically, the relationship analysis section 44 references the time series abnormality table 62 and the pattern abnormality table 63. The relationship analysis section 44 then extracts pairs of time series abnormalities and pattern abnormalities in which the date-time information of the time series abnormality precedes the date-time information of the pattern abnormality, and the generations thereof are the same (referred to below as a "time series abnormality-pattern abnormality pairs"). The relationship analysis section 44 also references the time series abnormality table 62 and the configuration modification pattern table 66. The relationship analysis section 44 then extracts pairs of time series abnormalities and configuration modification patterns in which the date-time information of the configuration modification pattern precedes the date-time information of the time series abnormality, and the generations thereof are the same (referred to below as a "time series abnormality-configuration modification pattern pairs").

The relationship analysis section 44 also extracts, from the extracted time series abnormality-pattern abnormality pairs and the time series abnormality-configuration modification pattern pairs, time series abnormality-pattern abnormality pairs and time series abnormality-configuration modification pattern pairs that share a common time series abnormality. The relationship analysis section 44 produces a single extraction result by listing the time series abnormality ID, the pattern abnormality ID, and the configuration modification pattern ID included in both of the extracted pairs, and then the relationship analysis section 44 allocates identification information (a result ID) to the list.

The result output section 50 places the extraction results extracted by the relationship analysis section 44 into an extraction result list 67 like that illustrated in FIG. 14 for example. The result output section 50 outputs the extraction result list 67 and various tables for referencing the extraction results. The various tables include the time series abnormality table 62, the pattern abnormality table 63, and the configuration modification pattern table 66 for referencing the respective contents of the time series abnormality ID, the pattern abnormality ID, and the configuration modification pattern ID recorded in the extraction result list 67. The various tables also include the key list 65 for identifying the configuration modification pattern, and the generation table 64 for identifying the keys indicated by the key IDs recorded in the key list 65. The various tables also include the common format data table 61 for referencing details of the time series abnormalities, the pattern abnormalities, and the configuration modification patterns.

Figure 15:
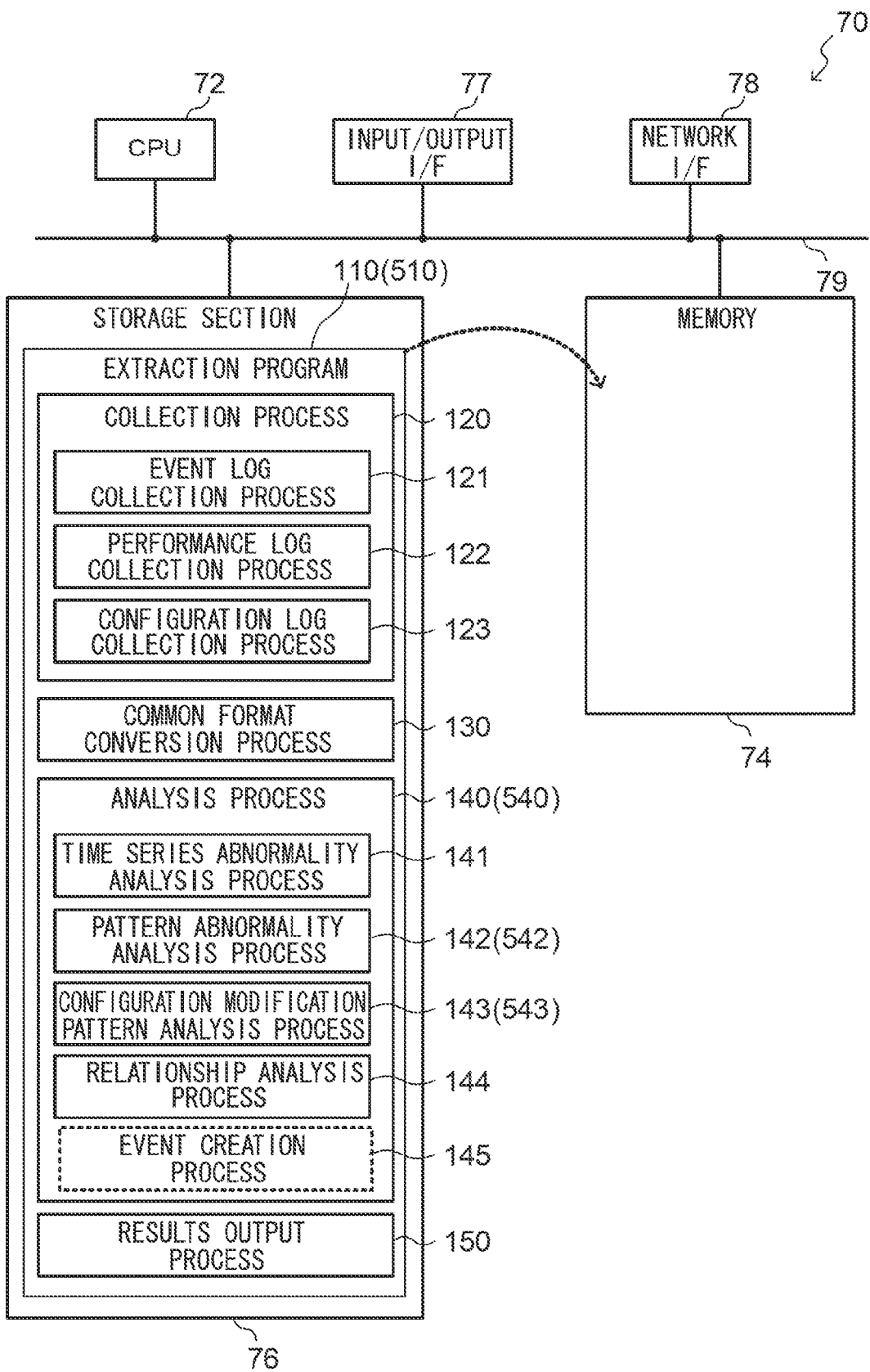
FIG. 15 is a block diagram illustrating a schematic configuration of a computer that functions as an extraction device according to the first and the second exemplary embodiment.

The extraction device 10 may, for example, be implemented by a computer 70 illustrated in FIG. 15. The computer 70 includes a CPU 72, memory 74, a non-volatile storage section 76, an input/output interface (I/F) 77, and a network I/F 78. The CPU 72, the memory 74, the storage section 76, the input/output I/F 77, and the network I/F 78 are connected to one another through a bus 79.

The storage section 76 may be implemented using a hard disk drive (HDD), solid state drive (SSD), flash memory, or the like. An extraction program 110 that causes the computer 70 to function as the extraction device 10 is stored in the storage section 76 that serves as a recording medium. The CPU 72 reads the extraction program 110 from the storage section 76, expands the extraction program 110 into the memory 74, and sequentially executes processes included in the extraction program 110.

The extraction program 110 includes a collection process 120, a common format conversion process 130, an analysis process 140, and a result output process 150. The collection process 120 includes an event log collection process 121, a performance log collection process 122, and a configuration log collection process 123. The analysis process 140 includes a time series abnormality analysis process 141, a pattern abnormality analysis process 142, a configuration modification pattern analysis process 143, and a relationship analysis process 144.

The CPU 72 operates as the event log collection section 21 illustrated in FIG. 2 by executing the event log collection process 121. The CPU 72 also operates as the performance log collection section 22 illustrated in FIG. 2 by executing the performance log collection section 22. The CPU 72 also operates as the configuration log collection section 23 illustrated in FIG. 2 by executing the configuration log collection process 123. The CPU 72 also operates as the common format convertor 30 illustrated in FIG. 2 by executing the common format conversion process 130. The CPU 72 also operates as the time series abnormality analysis section 41 illustrated in FIG. 2 by executing the time series abnormality analysis process 141. The CPU 72 also operates as the pattern abnormality analysis section 42 illustrated in FIG. 2 by executing the pattern abnormality analysis process 142. The CPU 72 also operates as the configuration modification pattern analysis section 43 illustrated in FIG. 2 by executing the configuration modification pattern analysis process 143. The CPU 72 also operates as the relationship analysis section 44 illustrated in FIG. 2 by executing the relationship analysis process 144. The CPU 72 also operates as the result output section 50 illustrated in FIG. 2 by executing the result output process 150. The computer 70 thereby functions as the extraction device 10 by executing the extraction program 110.

The extraction device 10 may be implemented by, for example, an integrated circuit, and more specifically, by an application specific integrated circuit (ASIC) or the like.

Figure 16:
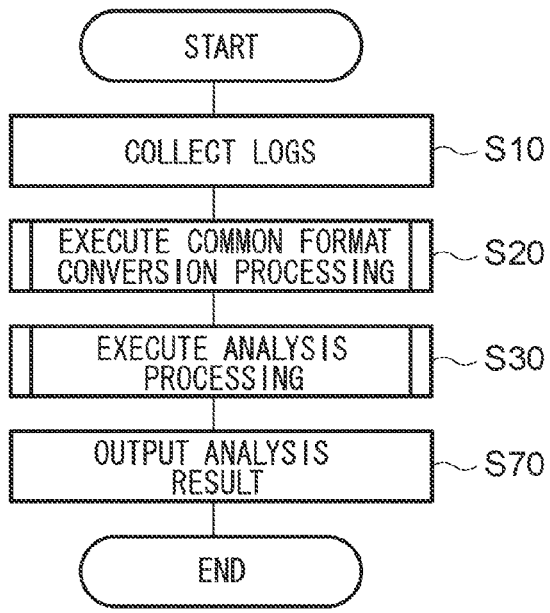
FIG. 16 is a flowchart illustrating an example of extraction processing.

Explanation follows regarding operation of the extraction device 10 according to the first exemplary embodiment. The extraction processing illustrated in FIG. 16 is executed in the extraction device 10. The extraction device 10 holds date-time information that indicates the beginning of each configuration generation of the processing device 16.

At step S10 of the extraction processing of illustrated in FIG. 16, the event log collection section 21 collects the event logs from each of the processing devices 16 together with the processing device ID. Moreover, the performance log collection section 22 collects the performance log from the each of the processing devices 16 together with the processing device ID. Moreover, the configuration log collection section 23 collects the configuration log from each of the processing devices 16 together with the processing device ID and the generation information. Next, common format conversion processing, illustrated in detail in FIG. 17, is executed at step S20.

Figure 17:
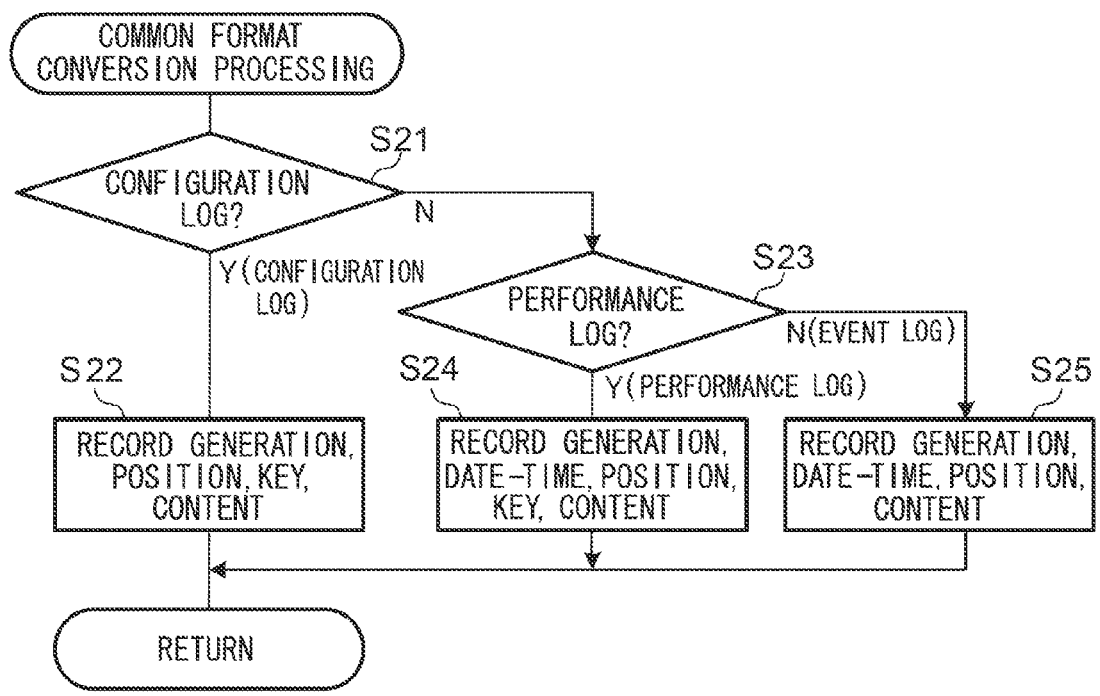
FIG. 17 is a flowchart illustrating an example of common format conversion processing.

At step S21 of the common format conversion processing illustrated in FIG. 17, the common format convertor 30 receives a log collected by the event log collection section 21, the performance log collection section 22, or the configuration log collection section 23. The common format convertor 30 then determines whether or not the received log is a configuration log. This determination may be performed by determining whether the log was received from the event log collection section 21, the performance log collection section 22, or the configuration log collection section 23. When the received log is a configuration log, processing transitions to step S22, and when the received log is a performance log or an event log, processing transitions to step S23.

At step S22, the common format convertor 30 extracts as a single piece of data each element (for example, one program from each row, from the second row onwards in the example of FIG. 5) together with the header (for example, the first row), from a configuration log like that illustrated in FIG. 5 for example. The common format convertor 30 then records the value of the extracted data heading in the "key" item of the common format data table 61, and records the value of each element in the "content" item. The common format convertor 30 also records the generation information and the processing device ID of the extraction source collected together with the configuration log, in the "generation" and the "position" items of the common format data table 61, respectively.

At step S23, the common format convertor 30 determines whether or not the received log is a performance log. When the received log is a performance log, processing transitions to step S24, and when the received log is an event log, processing transitions to step S25.

At step S24, the common format convertor 30 extracts as a signal piece of data respective performance items, together with the date-time information and the identification information, from a performance log like that illustrated in FIG. 4 for example. The common format convertor 30 then records the date-time information of the extracted data in the "date-time" item of the common format data table 61, records the combination of the identification information and the name of the performance item of the CPU in the "key" item, and records the value of the performance item in the "contents" item. Moreover, the common format convertor 30 records in the "generation" item the generation information determined based on the date-time information indicating the beginning of each generation held in the extraction device 10, and the date-time information included in the data extracted from the logs.

At step S25, from an event log like that illustrated in FIG. 3 for example, the common format convertor 30 extracts each data item delimited by the date-time information, and records the date-time information of the extracted data in the "date-time" item of the common format data table 61. The common format convertor 30 also records in the "contents" item the message portion other than the date-time information in the data extracted from the log. The common format convertor 30 also records the "generation" and "position" items similarly to as at step S24.

When each data item extracted from the received log has been recorded in the common format data table 61, namely, when conversion to the common format data is complete, the common format conversion processing ends, and processing returns to the extraction processing illustrated in FIG. 16. When plural logs are received, the present routine is executed for each of the logs.

Figure 18:
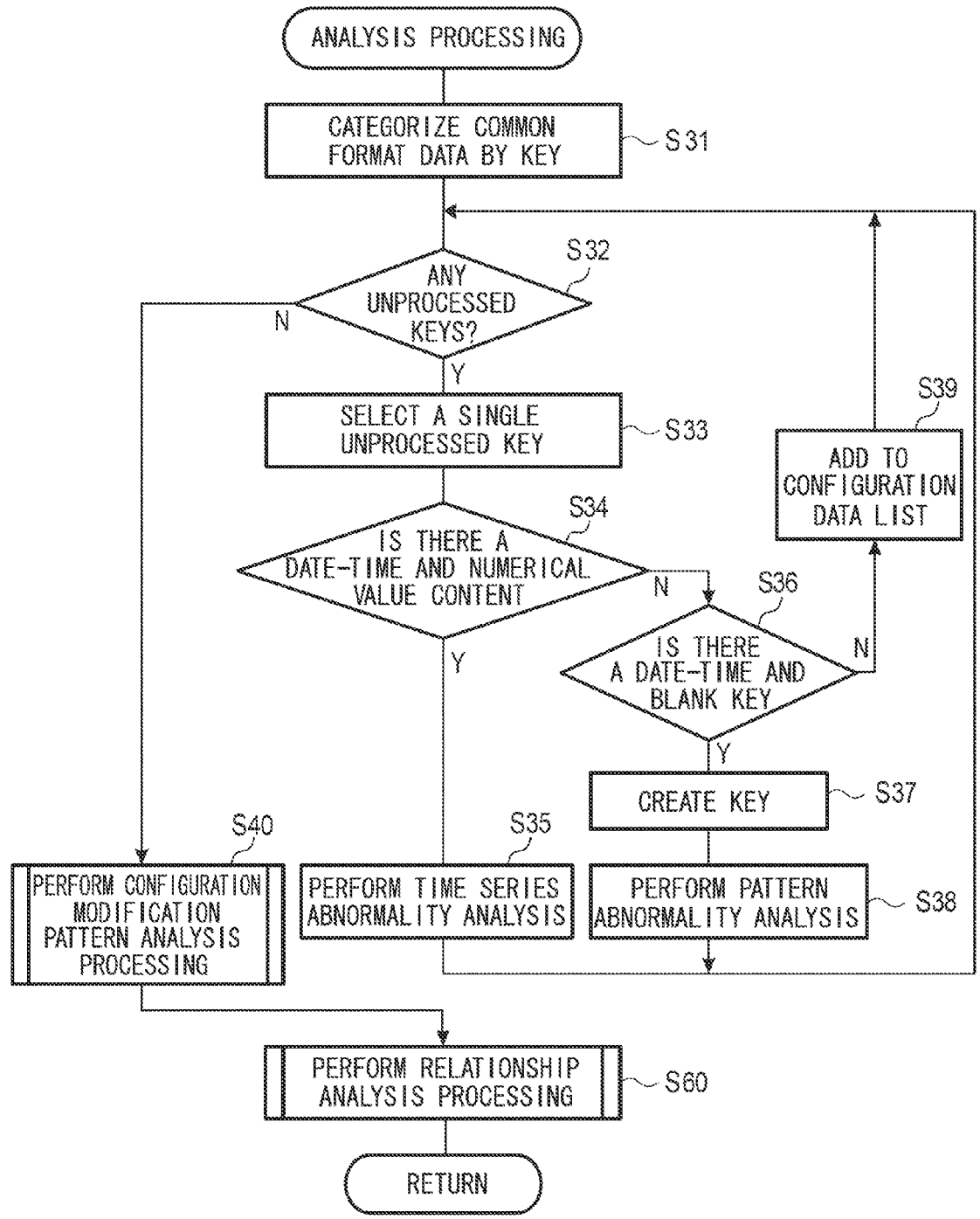
FIG. 18 is a flowchart illustrating an example of analysis processing of the first exemplary embodiment.

Next, at step S30 of the extraction processing illustrated in FIG. 16, the analysis processing illustrated in detail in FIG. 18 is executed.

At step S31 of the analysis processing illustrated in FIG. 18, the time series abnormality analysis section 41 categorizes the common format data recorded in the common format data table 61 into common format data groups having the same "key" and "position". Common format data items having a blank "key" item are categorized in a common format data group having a blank "key" item.

Next, at step S32, the time series abnormality analysis section 41 determines whether or not there are any unprocessed keys present, namely, keys indicating common format data groups that have not yet been processed by the processing below. When unprocessed keys are present, processing transitions to step S33, and when no unprocessed keys are present, processing transitions to step S40.

At step S33, the time series abnormality analysis section 41 selects a single unprocessed key. Next, at step S34, the time series abnormality analysis section 41 determines whether or not the "date-time" item is non-blank and the "contents" item is a numeric value, for all of the common format data included in the common format data group corresponding to the selected key. When an affirmative determination is made, processing transitions to step S35, and when a negative determination is made, processing transitions to step S36.

At step S35, the time series abnormality analysis section 41 detects points of change in the numeric values included in the common format data corresponding to the selected key in a series sorted by the date-time information, using, for example, anomaly analysis, and extracts these as places where time series abnormalities have occurred. The time series abnormality analysis section 41 then allocates identification information (a time series abnormality ID) to the date-time information corresponding to the places from which time series abnormalities were extracted, and records this information as information indicating a time series abnormality in the time series abnormality table 62 like that illustrated for example in FIG. 8, together with generation information.

At step S36, the pattern abnormality analysis section 42 determines whether or not the "date-time" item is non-blank, the "contents" item is not numeric value, and the "key" item is blank, for all of the common format data included in the common format data group corresponding to the key selected at step S33 described above. When an affirmative determination is made, processing transitions to step S37, and when a negative determination is made, processing transitions to step S39.

At step S37, the pattern abnormality analysis section 42 creates a common format data key based on the value recorded in the "contents" item of the common format data corresponding to the selected key. Next, at step S38, the pattern abnormality analysis section 42 extracts pattern abnormalities from a pattern represented by the key created for the common format data corresponding to the selected key in a series sorted by the date-time information. The pattern abnormality analysis section 42 then allocates identification information (the pattern abnormality ID) to the date-time information of the common format data that includes the key corresponding to the place from which a pattern abnormality was extracted, and records this information as information indicating a pattern abnormality, together with the generation information, in the pattern abnormality table 63 like that illustrated in FIG. 10 for example.

However, at step S39, since the common format data corresponding to the selected key was not subject to analysis by either the time series abnormality analysis section 41 or the pattern abnormality analysis section 42, the common format data corresponding to the selected key is temporarily added to a configuration data list in order to be subjected to analysis by the configuration modification pattern analysis section 43. The configuration data list may be configured similarly to the common format data table 61, except for the point that the data recorded therein is subject to analysis by the configuration modification pattern analysis section 43.

Figure 19:
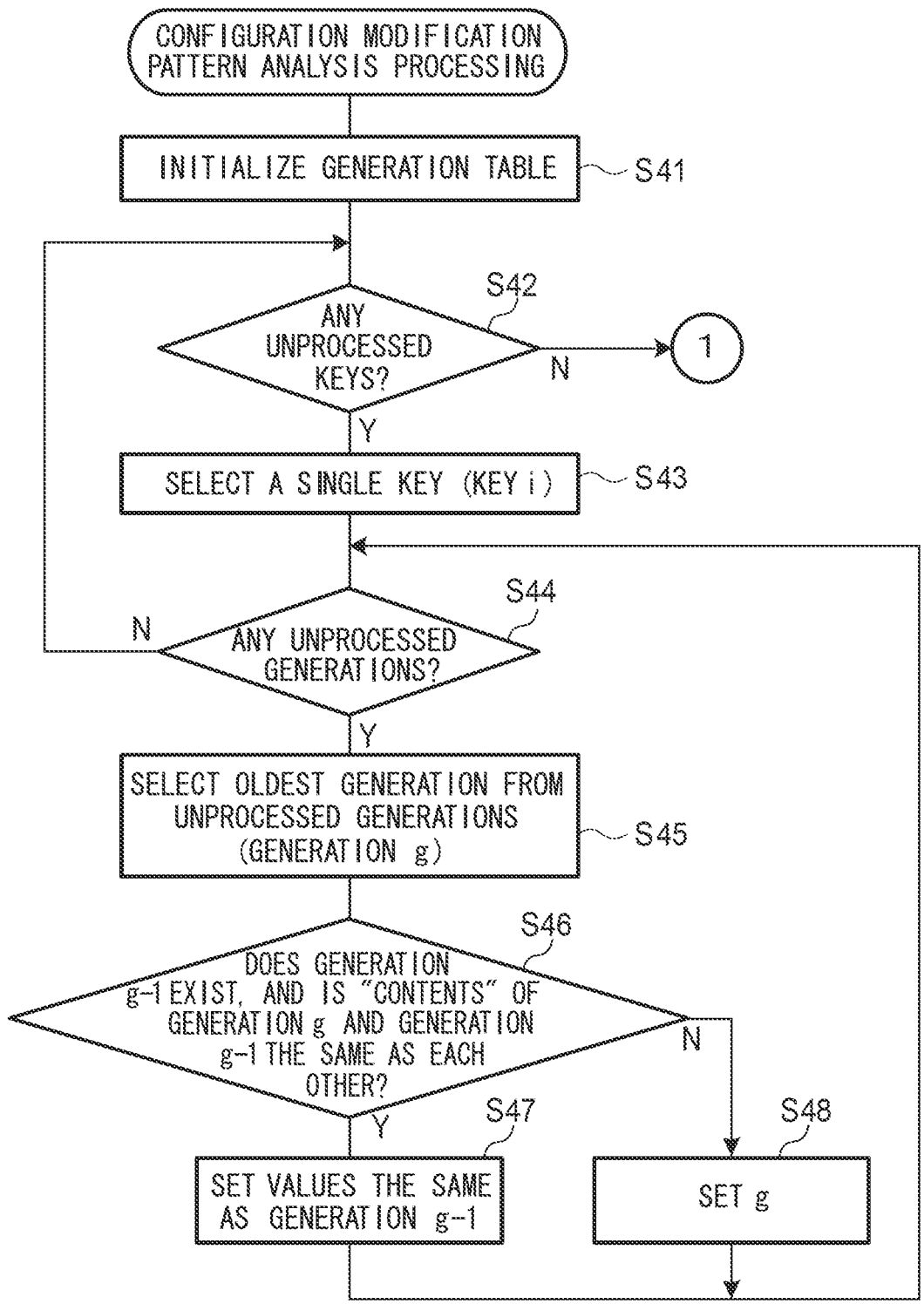
FIG. 19 is a flowchart illustrating an example of configuration modification pattern analysis processing.
Figure 20:
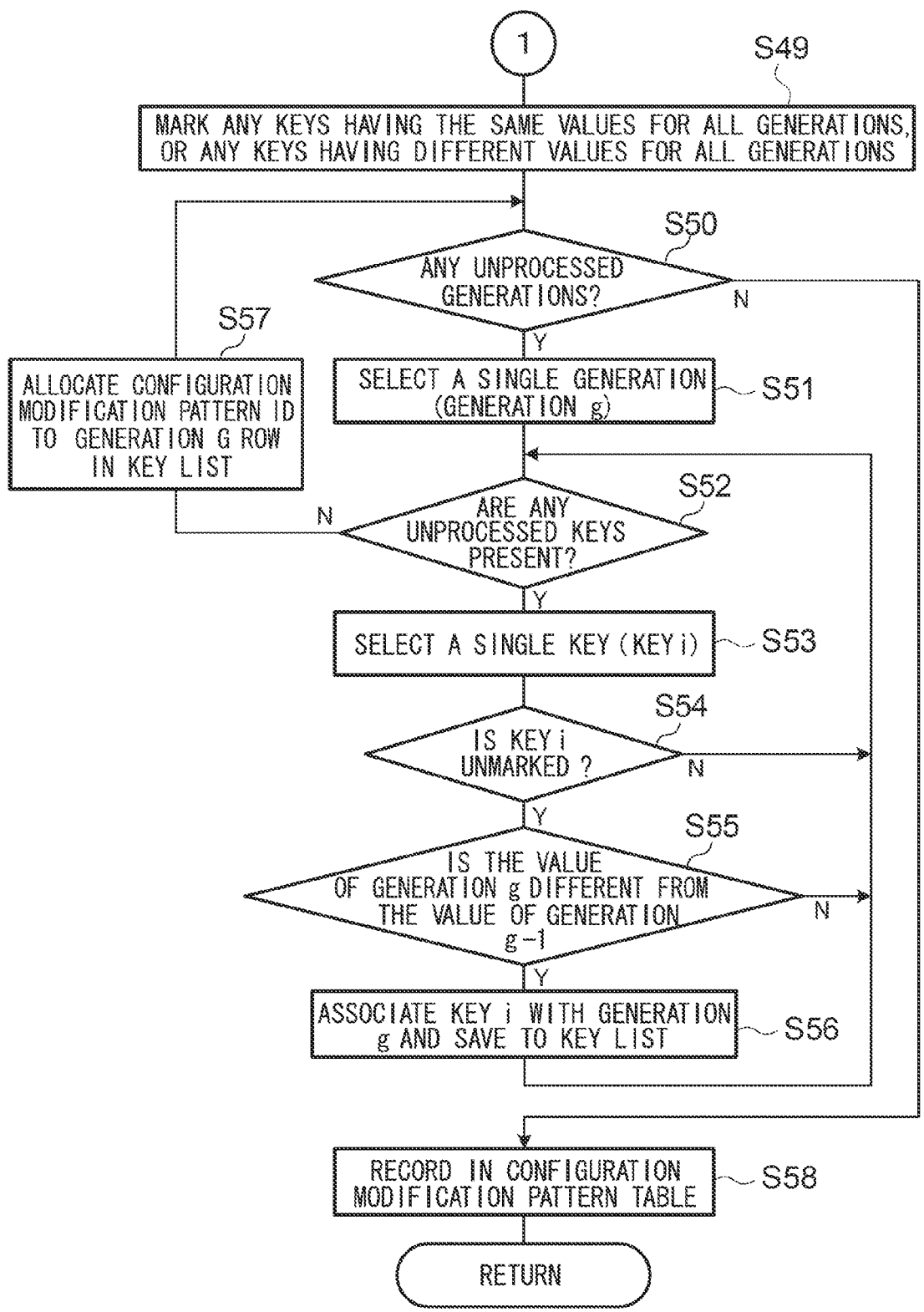
FIG. 20 is a flowchart illustrating an example of configuration modification pattern analysis processing.

At step S40, the configuration modification pattern analysis processing, illustrated in detail in FIG. 19 and FIG. 20, is executed.

At step S41 of the configuration modification pattern analysis processing of FIG. 19, the configuration modification pattern analysis section 43 initializes the generation table 64. More specifically, the configuration modification pattern analysis section 43 sets a row in the generation table 64 for each type of key for all of the common format data saved in the configuration data list, and allocates a key ID to each key. A column of the generation table 64 is set for each of all the generations included in the common format data saved in the configuration data list, in order of generation information.

Next, at step S42, the configuration modification pattern analysis section 43 determines whether or not there are unprocessed keys, and processing transitions to step S43 if there are unprocessed keys present, and processing transitions to step S49 of FIG. 20 if there are no unprocessed keys present. At step S43, the configuration modification pattern analysis section 43 selects a single key from the unprocessed keys (a key with an ID of i; denoted "key i" below).

Next, at step S44, the configuration modification pattern analysis section 43 determines whether or not there are any generations, from among the generations set in the column of the generation table 64, on which the processing below has not been performed. Processing transitions to step S45 if an unprocessed generation is present, and processing returns to step S42 if no unprocessed generations are present.

At step S45, the configuration modification pattern analysis section 43 selects the oldest generation from out of the unprocessed generations (generation g; in the example of FIG. 11, g=1, 2, and so on up to 6). Next, at step S46, the configuration modification pattern analysis section 43 references the common format data having key i, saved in the configuration data list, and determines whether or not the value of the "contents" for the common format data of generation g is the same as the value of the "contents" for the common format data of generation g−1. Processing transitions to step S47 if the values of the "contents" are the same as each other, and processing transitions to step S48 if the values are different from each other. Moreover, processing also transitions to step S48 in cases in which no generation g−1 exists (for example, as in the case of g=1 in the example of the generation table 64 in FIG. 11).

At step S47, the configuration modification pattern analysis section 43 sets the cell appearing in the row corresponding to key i, and the column corresponding to generation g, to the value set for the cell appearing in the row corresponding to the key i and the column corresponding to the generation g−1 of the generation table 64. At step S48, the configuration modification pattern analysis section 43 sets "g" in the cell appearing in the row corresponding to key i, and the column corresponding to generation g.

Next, at step S49 of FIG. 20, the configuration modification pattern analysis section 43 appends a mark to keys in the generation table 64 that correspond rows in which the same value is set for the entire row, and rows in which different values are set for the entire row. The mark is a mark indicating that the key is to be excluded from being subject to configuration modification pattern extraction processing. Note that although rows in which the same value is set for the entire row are not extracted as configuration modification patterns, even when not appended with a mark to keys, appending the mark enables the processing below to be simplified.

Next, at step S50, the configuration modification pattern analysis section 43 determines whether or not there unprocessed generations. When unprocessed generations are present, processing transitions to step S51, and the configuration modification pattern analysis section 43 selects a single generation g from the unprocessed generations.

Next, at step S52, the configuration modification pattern analysis section 43 determines whether or not there are unprocessed keys, and processing transitions to step S53 if unprocessed keys are present, and the configuration modification pattern analysis section 43 selects a single key i from the unprocessed keys.

Next, at step S54, the configuration modification pattern analysis section 43 determines whether or not a mark has been appended to the key i. Processing transitions to step S55 if a mark has not been appended to the key i, and processing returns to step S52 if a mark has been appended to the key i.

At step S55, the configuration modification pattern analysis section 43 determines whether or not the values set for the column corresponding to the generation g and for the column corresponding to the generation g−1 are different from each other in the row of the generation table 64 corresponding to the key i. Processing transitions to step S56 if the values are different, and processing returns to step S52 if the values are the same. At step S56, the configuration modification pattern analysis section 43 adds the row of generation g to the key list 65 like that illustrated in FIG. 12 for example, and records the "i" in the corresponding key ID item. Note that if a row already exists in the key list 65 the row of generation g, then "i" is added to the key IDs of that row.

At step S52, processing transitions to step S57 if determination is made that no unprocessed keys are present. At step S57, the configuration modification pattern analysis section 43 allocates the configuration modification pattern ID to the row of generation g in the key list 65, and processing returns to step S50.

At step S50, if determination is made that no unprocessed generations are present, processing transitions to step S58, and the configuration modification pattern analysis section 43 determines the date-time information corresponding to the configuration modification pattern based on the generations included in the extracted configuration modification pattern, and the held date-time information indicating the beginning of the generations. The configuration modification pattern analysis section 43 then allocates identification information (the configuration modification pattern ID) to the determined date-time information, and this information is recorded as information indicating the configuration modification pattern, together with the generation information, in the configuration modification pattern table 66 like that illustrated in FIG. 13 for example. When recording to the configuration modification pattern table 66 is complete, processing returns to the analysis processing illustrated in FIG. 18.

Figure 21:
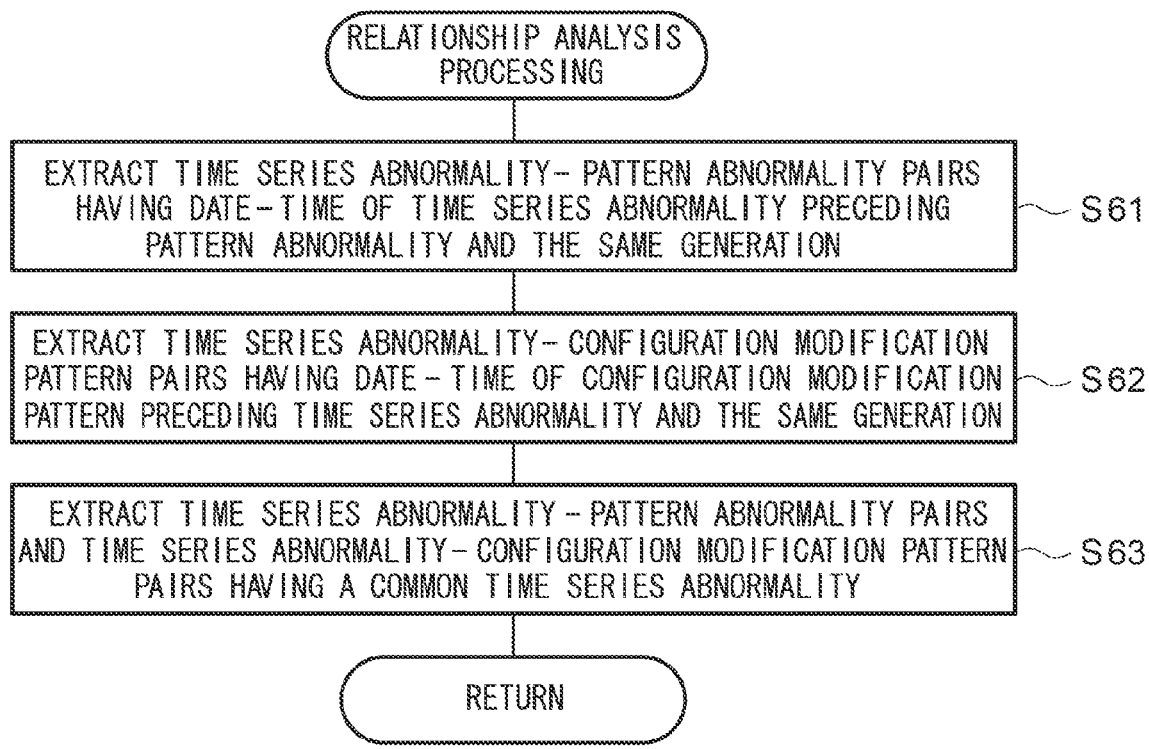
FIG. 21 is a flowchart illustrating an example of relationship analysis processing.

Next, at step S60 of the analysis processing illustrated in FIG. 18, the relationship analysis processing, illustrated in detail in FIG. 21, is executed.

At step S61 of the analysis processing illustrated in FIG. 21, the relationship analysis section 44 references the time series abnormality table 62 and the pattern abnormality table 63. The relationship analysis section 44 then extracts time series abnormality-pattern abnormality pairs in which the date-time information of the time series abnormality precedes the date-time information of the pattern abnormality, and the generations are the same as each other.

Then at step S62, the relationship analysis section 44 references the time series abnormality table 62 and the configuration modification pattern table 66. The relationship analysis section 44 then extracts time series abnormality-configuration modification pattern pairs in which the date-time information of the configuration modification pattern precedes the date-time information of the time series abnormality, and the generations are the same as each other.

Next, at step S63, from the extracted time series abnormality-pattern abnormality pairs and the time series abnormality-configuration modification pattern pairs, the relationship analysis section 44 extracts any pairs of time series abnormality-pattern abnormality and pairs of time series abnormality-configuration modification pattern that have a time series abnormality in common with each other. The relationship analysis section 44 then produces a single extraction result by listing the time series abnormality ID, the pattern abnormality ID, and the configuration modification pattern ID included in both of the extracted pairs, and appends a result ID thereto. Processing then returns to the extraction processing illustrated in FIG. 16.

Next, at step S70 of the extraction processing illustrated in FIG. 16, the result output section 50 places the extraction result extracted by the relationship analysis section 44 into an extraction result list 67 like that illustrated in FIG. 14 for example. The result output section 50 then outputs the extraction result list 67 together with various tables such as the time series abnormality table 62, the pattern abnormality table 63, and the configuration modification pattern table 66.

Figure 22:
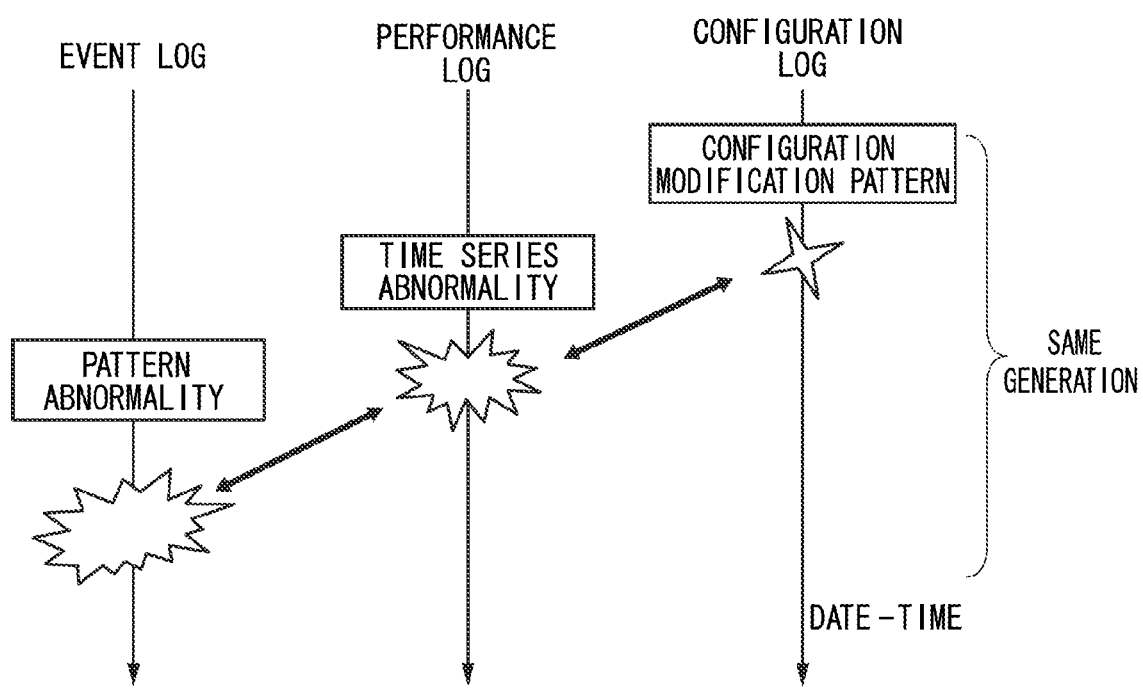
FIG. 22 is a diagram for explaining cross-sectional relationships between pattern abnormalities, time series abnormalities, and configuration modification patterns.

As described above, in the extraction device according to the first exemplary embodiment, time series abnormalities, pattern abnormalities, and configuration modification patterns are each analyzed in event logs, performance logs, and configuration logs. Relationships between the time series abnormalities, the pattern abnormalities, and the configuration modification patterns are then analyzed using the date-time at which they occurred as a clue. Different types of information obtainable from processing devices can accordingly be associated with abnormalities that have occurred in the processing devices, and extracted. Referencing these extraction results enables relationships between pattern abnormalities, time series abnormalities, and configuration modification patterns to be ascertained in a cross-sectional manner as illustrated in FIG. 22 for example, and enables the causes of abnormalities to be deduced. More specifically, whether or not abnormalities of the processing devices 16 were detected as pattern abnormalities can easily be ascertained according to what type of causing configuration modification was performed on the processing devices 16, and according to what portion of the resources the abnormality occurred.

Handling time series abnormalities, pattern abnormalities, and configuration modification patterns included in the same generation as individual groups of related extraction results enables which configuration modification caused the abnormality that occurred to be ascertained with greater certainty.

Explanation of the first exemplary embodiment has been given regarding a case in which, when the values included in the data extracted from the configuration log have changed between the generation g and the generation g−1, this is extracted as a configuration modification pattern; however, there is no limitation thereto. As illustrated in FIG. 23 for example, a window 68 may be set that includes plural generations before and after a given generation g for each row (each key) in the generation table 64. In the example of FIG. 23, the window 68 is set to four generations worth for generation g=4: two generations prior to generation g (the first half), and two generations onward from generation g including generation g (the second half). Then, a configuration pattern indicating that there was a configuration modification at generation g may be extracted when each of the values set for the cells in the first half of the window 68 are the same as each other, each of the values set for the cells of the second half are the same as each other, and the values in the first half are different from the values in the second half. This enables the fact that the configuration was modified at that generation to be perceived with greater certainty than in cases in which comparison is made against the value of only one prior generation.

Although explanation has been given for the first exemplary embodiment regarding a case in which values set in the generations table are taken as generation numbers, there is no limitation thereto. It is sufficient that the same value is set between generations when the values of the "contents" of common format data are the same as each other, and set to different values when the "contents" values are different from each other.

Although explanation has been given for the first exemplary embodiment regarding a case in which data extracted from each type of log is converted into a common format, there is no limitation thereto. In the first exemplary embodiment, it is sufficient that the respective data used in the time series abnormality analysis, the pattern abnormality analysis, and the configuration modification pattern analysis, are converted to a format corresponding to each analysis.

Second Exemplary Embodiment

Next, explanation follows regarding a second exemplary embodiment. Note that for an extraction device according to the second exemplary embodiment, portions similar to those of the extraction device 10 according to the first exemplary embodiment are allocated the same reference numerals, and detailed explanation thereof is omitted.

Figure 24:
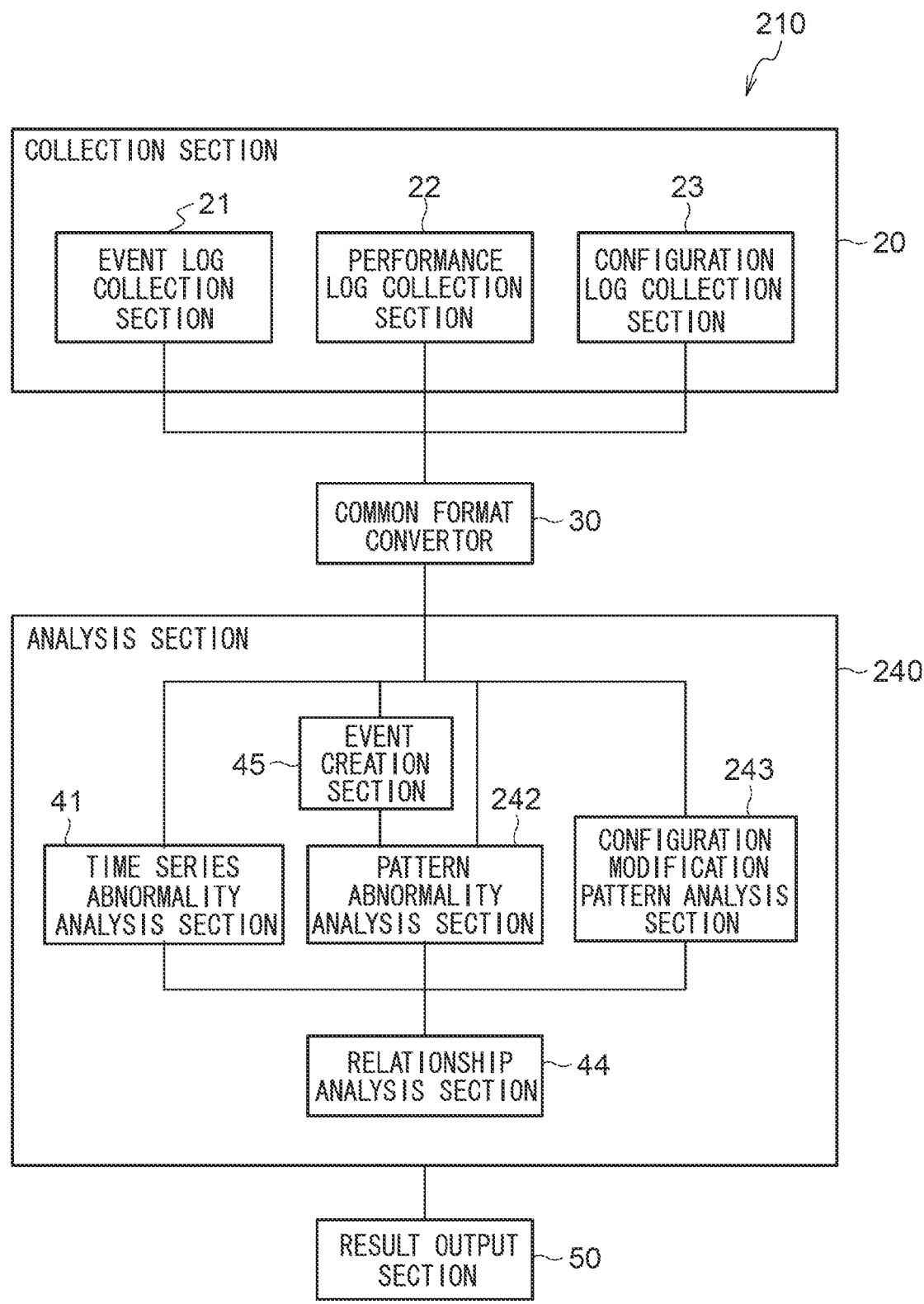
FIG. 24 is a functional block diagram of an extraction device according to the second exemplary embodiment.

As illustrated in FIG. 24, an extraction device 210 includes a collection section 20, a common format data conversion section 30, an analysis section 240, and a result output section 50. The analysis section 240 includes a time series abnormality analysis section 41, a pattern abnormality analysis section 242, a configuration modification pattern analysis section 243, a relationship analysis section 44, and an event creation section 45.

The event creation section 45 extracts, from the common format data recorded in the common format data table 61, common format data having a non-blank "date-time" item and a numeric value for the "contents" item. When the extracted common format data having numeric values satisfies a specific rule, the event creation section 45 creates an event indicating that the rule was satisfied. The specific rule is stored in an event building rule table 69 like that illustrated in FIG. 25 for example. A rule with rule ID=1, stored in the event building rule table 69 illustrated in FIG. 25 indicates that an event is created when an average value of the "contents" of common format data having "cpu1_usage" as the "key" is a threshold=0.75 or greater. When a single rule is applied to the plural pieces of common format data, such as a rule of taking the average of plural values of the common format data as in the example described above, the rule is applied to common format data having the same "generation" and "position".

For example, configuration is made such that four pieces of common format data items having the same "generation" and "position" (in the example of FIG. 26, generation=1, and position=web01) are extracted from out of the common format data having numeric values recorded in the common format data table 61 as illustrated in FIG. 26. The event creation section 45 applies, for example, the rule illustrated in FIG. 25, and creates an event indicating the rule was satisfied, like that illustrated in FIG. 27 for example, in cases in which four common format data items have an average value of "contents" of threshold=0.75 or greater. The event is created in a common format.

More specifically, the event creation section 45 sets the "generation" and "position" of the created event with the same "generation" and "position" as in the common format data to which the rule was applied. The event creation section 45 sets the "date-time" of the created event with the latest date-time information, the oldest date-time information, or the like, out of the "date-time" items of the common format data to which the rule was applied. The event creation section 45 also sets the "key" of the created event with a key that indicates that the event was created by the rule being satisfied. For example, a key arrived at by adding "_event" to the key of the applied rule may be set. Note that the "contents" item of the created event may be blank. The event creation section 45 transfers the created event to the pattern abnormality analysis section 242.

The configuration modification pattern analysis section 243 analyzes configuration modification patterns similarly to the configuration modification pattern analysis section 43 of the first exemplary embodiment. The configuration modification pattern analysis section 243 also sets the "date-time" of the common format data for use in configuration modification pattern analysis with the starting time of the generation of configuration indicated by that common format data, and transfers this common format data to the pattern abnormality analysis section 242.

Figure 28:
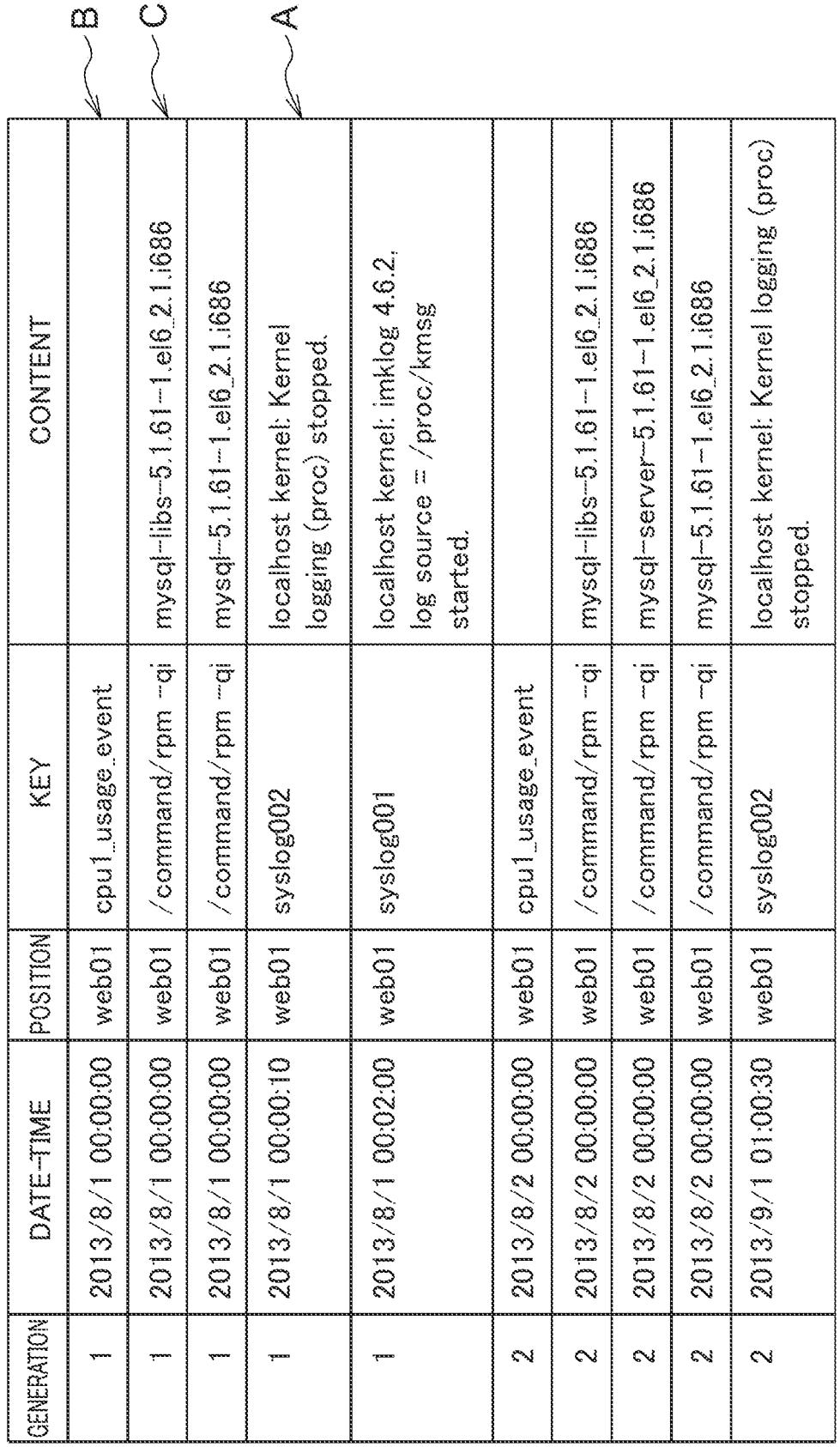
FIG. 28 is a diagram illustrating an example of common format data subject to analysis by a pattern abnormality analysis section of the second exemplary embodiment.

The pattern abnormality analysis section 242 subjects the common format data extracted from the event logs to analysis, similarly to the analysis target of the pattern abnormality analysis section 42 according to the first exemplary embodiment. In the second exemplary embodiment, the common format data transferred from the event creation section 45 and the configuration modification pattern analysis section 243 are also additionally subjected to pattern abnormality analysis. FIG. 28 illustrates an example of common format data subjected to analysis by the pattern abnormality analysis section 242 of the second exemplary embodiment. Similarly to in the first exemplary embodiment, the row indicated by A in FIG. 28 is an example of common format data in which a key was created for the common format data extracted from the event log. The row indicated by B in FIG. 28 is an example of an event (common format data) transferred from the event creation section 45. The row indicated by C in FIG. 28 is an example of common format data transferred from the configuration modification pattern analysis section 243.

Similarly to in the first exemplary embodiment, for the common format data subject to analysis, like that illustrated in FIG. 28, the pattern abnormality analysis section 242 analyzes pattern abnormalities based on a pattern expressed in keys of the common format data sorted into a series by the date-time information.

The extraction device 210 may be implemented by the computer 70 illustrated in FIG. 15 for example. An extraction program 510 that causes the computer 70 to function as the extraction device 210 is stored in the storage section 76. The CPU 72 reads the extraction program 510 from the storage section 76, expands the extraction program 510 into the memory 74, and sequentially executes the processes included in the extraction program 510.

The extraction program 510 includes a collection process 120, a common format conversion process 130, an analysis process 540, and a results output process 150. The analysis process 540 includes a time series abnormality analysis process 141, a pattern abnormality analysis process 542, a configuration modification pattern analysis process 543, a relationship analysis process 144, and an event creation process 145.

The CPU 72 operates as the pattern abnormality analysis section 242 illustrated in FIG. 24 by executing the pattern abnormality analysis process 542. The CPU 72 also operates as the configuration modification pattern analysis section 243 illustrated in FIG. 24 by executing the configuration modification pattern analysis process 543. The CPU 72 also operates as the event creation section 45 illustrated in FIG. 24 by executing the event creation process 145. The other processes are similar to in the first exemplary embodiment. The computer 70 thereby functions as the extraction device 210 by executing the extraction program 510.

The extraction device 210 may be implemented using, for example, an integrated semiconductor circuit, and more specifically, by an ASIC or the like.

Next, explanation follows regarding operation of the extraction device 210 according to the second exemplary embodiment. The extraction processing executed by the extraction device 210 according to the second exemplary embodiment has different content of analysis processing from the extraction processing of the first exemplary embodiment. Explanation follows regarding the analysis processing of the second exemplary embodiment, with reference to FIG. 29. Note that processing similar to the analysis processing of the first exemplary embodiment is allocated the same reference numeral, and detailed explanation thereof is omitted.

Figure 29:
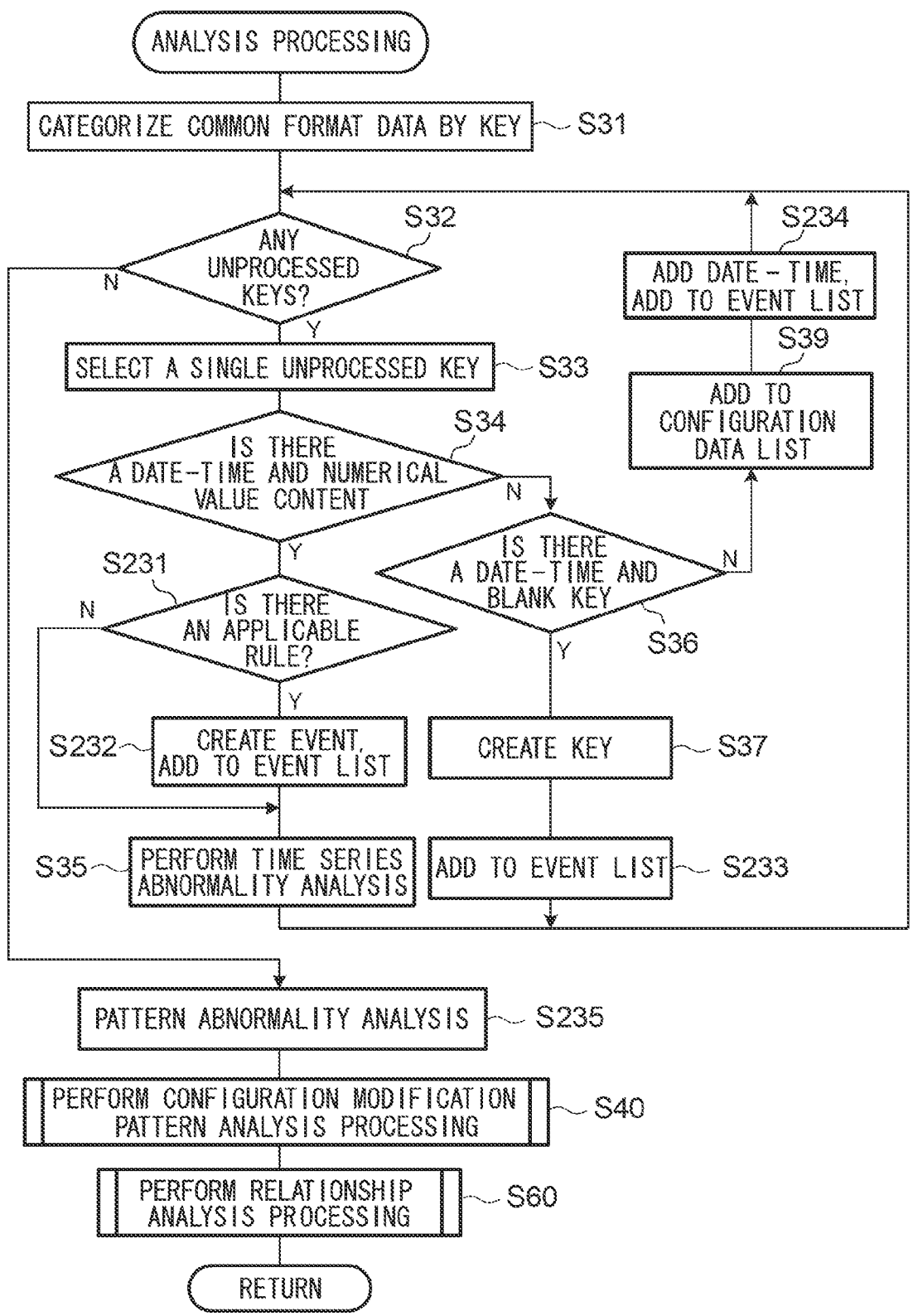
FIG. 29 is a flowchart illustrating an example of analysis processing of the second exemplary embodiment.

At step S34 of the analysis processing illustrated in FIG. 29, the time series abnormality analysis section 41 determines whether or not the "date-time" item is non-blank and the "contents" item is a numeric value, for all of the common format data included in the common format data group corresponding to the selected key. When an affirmative determination is made, processing transitions to step S231, and when a negative determination is made, processing transitions to step S36.

Next, at step S231, the event creation section 45 further categorizes the common format data group corresponding to the selected key, by each "generation" and "position". The event building rule table 69 is then referenced, and determination is made as to whether or not there is a rule present that is applicable to each common format data group. Processing transitions to step S232 if such a rule is present, and processing transitions to step S35 if no such rule is present.

At step S232, when each of the common format data groups has satisfied the applied rule, the event creation section 45 creates as event, as common format data, indicating that the rule was satisfied. The event creation section 45 temporarily adds the created event to the event list. The event list may be configured similarly to the common format data table 61.

At step S35, similarly to in the first exemplary embodiment, the time series abnormality analysis section 41 performs time series abnormality analysis based on the common format data group corresponding to the selected key, and processing returns to step S32.

At step S37, the pattern abnormality analysis section 242 creates a key for each piece of common format data based on the value recorded in the "contents" item of common format data for which the "date-time" item is non-blank, the "contents" item is not a numeric value, and the "key" item is blank. Next, at step S233, the pattern abnormality analysis section 242 adds the common format data for which the key was created to the event list, and processing transitions to step S32.

Moreover, when negative determination is made at step S34 and at step S36, and processing has transitioned to step S39, the configuration modification pattern analysis section 243 temporarily adds the common format data corresponding to the selected key to the configuration data list. Then, at step S234, the configuration modification pattern analysis section 243 sets the common format data corresponding to the selected key with the beginning time of the generation of the configuration indicated by that common format data, and adds this data to the event list, then processing returns to step S32.

When negative determination is made at step S32, processing transitions to step S235, and similarly to in the first exemplary embodiment, the pattern abnormality analysis section 242 subjects the common format data stored in the event list to analysis and extracts a pattern abnormality. At step S235, events created by applying a specific rule to common format data that has been converted from data extracted from the performance logs, and data arrived at by adding date-time information to the common format data extracted and converted from the configuration log, are accordingly subject to pattern abnormality analysis.

As explained above, according to the extraction device 210 of the second exemplary embodiment, pattern abnormality analysis can be performed by combining plural types of data by converting data extracted from various types of different logs into common format data.

Note that in the second exemplary embodiment, explanation has been given of a case in which data respectively extracted from the event log, the performance log, and the configuration log are converted into common format data, and the common format data is further converted into data for use in pattern abnormality analysis; however, there is not limitation thereto. Data respectively extracted from the event log, the performance log, and configuration log may be converted into two types of common format data. For example, data extracted from the event log and the configuration log may be converted into common format data, and pattern abnormality analysis may be performed based on this common format data. Moreover, in such a case, relationships may be analyzed between time series abnormalities analyzed based on data extracted from the performance log, and pattern abnormalities analyzed based on common format data having the event log and the configuration log as the extraction origin.

Although explanation has been given above regarding a mode in which the extraction programs 110, 510 serving as examples of an extraction program according to technology disclosed herein are pre-stored (pre-installed) in the storage section 76, there is no limitation thereto. An extraction program according to technology disclosed herein may be supplied recorded on a recording medium such as a CD-ROM, a DVD-ROM, or USB memory.

Information indicating the configuration of the system, information indicating the performance of the system, and the event logs are each different information. Relationships between these types of information are unclear, and the volume of these types of information is large. A great amount of time is therefore required for relationships between these types of information to be determined using human endeavors in order to deduce the causes of abnormalities that have occurred in the system, and this is inefficient.

An aspect according to technology disclosed herein has the advantageous effect of enabling information of different types, obtainable from a processing device subject to monitoring, to be associated with abnormalities occurring in the processing device, and extracted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An extraction method comprising:
    acquiring configuration information indicating a configuration of a processing device for each generation that represents a respective time period between configuration modifications, and extracting first information indicating configuration modifications between generations based on a plurality of generations of the acquired configuration information;
    acquiring performance information indicating various types of performance of the processing device at respective times, and extracting, as second information associated with one of the generations, a time when an abnormality was detected in change to a time series of the acquired performance information;
    acquiring event information indicating an event occurring in the processing device at respective times, and extracting, as third information associated with one of the generations, a time of event information creation when an abnormality was detected; and
    by a processor, extracting any pieces of the first information, pieces of the second information, and pieces of the third information that have a relationship to each other, based on the generation indicated by the first information and a time when the processing device was modified to the configuration of an indicated generation, based on a time indicated by the second information and the generation associated with the second information, and based on a time indicated by the third information and the generation associated with the third information.

2. The extraction method of claim 1, wherein, when extracting the third information, configuration information appended with a time of modification to the configuration of the generation is employed as the event information.

3. The extraction method of claim 1, wherein
    when extracting the third information, in a case where the performance information has satisfied a predetermined condition, converted performance information that satisfies the condition is employed as event information.

4. The extraction method of claim 1, further comprising:
    respectively converting the configuration information, the performance information, and the event information into common format data.

5. The extraction method of claim 1, wherein
    when extracting the first information, based on the plurality of generations worth of configuration information, a generations table is created in which the same value is set for each generation in cases in which the contents of the configuration information are the same as each other, and different values are set for each generation in cases in which the contents of the configuration information are different from one another, and a pattern representing differences between values set in the generations table is extracted as the first information.

6. An extraction device comprising:
    a processor configured to execute a process, the process comprising:
    acquiring configuration information indicating a configuration of a processing device for each generation that represents a respective time period between configuration modifications, and extracting first information indicating configuration modifications between generations based on a plurality of generations of the acquired configuration information;
    acquiring performance information indicating various types of performance of the processing device at respective times, and extracting, as second information associated with one of the generations, a time when an abnormality was detected in change to a time series of the acquired performance information;
    acquiring event information indicating an event occurring in the processing device at respective times, and extracting, as third information associated with one of the generations, a time of event information creation when an abnormality was detected; and
    extracting any pieces of the first information, pieces of the second information, and pieces of the third information that have a relationship to each other, based on the generation indicated by the first information and a time when the processing device was modified to the configuration of an indicated generation, based on a time indicated by the second information and the generation associated with the second information, and based on a time indicated by the third information and the generation associated with the third information.

7. The extraction device of claim 6, wherein in the process, when extracting the third information, configuration information appended with a time of modification to the configuration of the generation is employed as the event information.

8. The extraction device of claim 6, wherein in the process, when extracting the third information, in a case where the performance information has satisfied a predetermined condition, converted performance information that satisfies the condition is employed as event information.

9. The extraction device of claim 6, wherein the process further comprises:
    respectively converting the configuration information, the performance information, and the event information into common format data.

10. The extraction device of claim 6, wherein in the process, when extracting the first information, based on the plurality of generations worth of configuration information, a generations table is created in which the same value is set for each generation in cases in which the contents of the configuration information are the same as each other, and different values are set for each generation in cases in which the contents of the configuration information are different from one another, and a pattern representing differences between values set in the generations table is extracted as the first information.

11. A non-transitory recording medium storing an extraction program that causes a computer to execute a process, the process comprising:

acquiring configuration information indicating a configuration of a processing device for each generation that represents a respective time period between configuration modifications, and extracting first information indicating configuration modifications between generations based on a plurality of generations of the acquired configuration information;

acquiring performance information indicating various types of performance of the processing device at respective times, and extracting, as second information associated with one of the generations, a time when an abnormality was detected in change to a time series of the acquired performance information;

acquiring event information indicating an event occurring in the processing device at respective times, and extracting, as third information associated with one of the generations, a time of event information creation when an abnormality was detected; and extracting any pieces of the first information, pieces of the second information, and pieces of the third information that have a relationship to each other, based on the generation indicated by the first information and a time when the processing device was modified to the configuration of an indicated generation, based on a time indicated by the second information and the generation associated with the second information, and based on a time indicated by the third information and the generation associated with the third information.

12. The non-transitory recording medium of claim 11, wherein in the process, when extracting the third information, configuration information appended with a time of modification to the configuration of the generation is employed as the event information.

13. The non-transitory recording medium of claim 11, wherein in the process, when extracting the third information, in a case where the performance information has satisfied a predetermined condition, converted performance information that satisfies the condition is employed as event information.

14. The non-transitory recording medium of claim 11, wherein the process further comprises:

respectively converting the configuration information, the performance information, and the event information into common format data.

15. The non-transitory recording medium of claim 11, wherein in the process, when extracting the first information, based on the plurality of generations worth of configuration information, a generations table is created in which the same value is set for each generation in cases in which the contents of the configuration information are the same as each other, and different values are set for each generation in cases in which the contents of the configuration information are different from one another, and a pattern representing differences between values set in the generations table is extracted as the first information.

* * * * *